United States Patent
Zhang et al.

(10) Patent No.: US 8,253,814 B2
(45) Date of Patent: Aug. 28, 2012

(54) OCULAR MOTOR CONTROLLER USING PRINCIPLE OF VESTIBULO-OCULAR REFLEX

(75) Inventors: Xiaolin Zhang, Yokohama (JP);
Tsukasa Odagawa, Yokohama (JP);
Yukari Ishihara, legal representative, Yokohama (JP)

(73) Assignee: Tokyo Institute of Technology, Tokyo (JP)

(*) Notice: Subject to any disclaimer, the term of this patent is extended or adjusted under 35 U.S.C. 154(b) by 281 days.

(21) Appl. No.: 12/663,897

(22) PCT Filed: Jun. 6, 2008

(86) PCT No.: PCT/JP2008/001442
§ 371 (c)(1),
(2), (4) Date: Jun. 30, 2010

(87) PCT Pub. No.: WO2008/152791
PCT Pub. Date: Dec. 18, 2008

(65) Prior Publication Data
US 2010/0295972 A1   Nov. 25, 2010

(30) Foreign Application Priority Data
Jun. 12, 2007   (JP) ................. 2007-154612

(51) Int. Cl.
*H04N 5/228* (2006.01)
(52) U.S. Cl. ............ 348/208.99; 348/208.1; 348/208.2; 348/208.3; 348/208.4; 348/208.5
(58) Field of Classification Search ............ 348/208.99, 348/208.1, 208.2, 208.3, 208.4, 208.5, 222.1, 348/241, 243, 246, 247; 396/52; 382/103, 382/107, 178
See application file for complete search history.

(56) References Cited

U.S. PATENT DOCUMENTS
2005/0185945 A1   8/2005   Zhang et al.
2008/0232707 A1*  9/2008   Lee et al. ................. 382/255

FOREIGN PATENT DOCUMENTS
JP   2002-049067   2/2002
JP   2004-348147   12/2004
JP   2006-502675   1/2006
* cited by examiner

*Primary Examiner* — Yogesh Aggarwal
(74) *Attorney, Agent, or Firm* — Wells St. John P.S.

(57) ABSTRACT

An ocular motor controller for preventing an image blur by using the principle of vestibulo-ocular reflex in response to translational movement. The ocular motor controller comprises an image pickup section (20) used as an ocular device, an ocular drive section (30) for rotating the image pickup section, a distance information acquisition section (40) for acquiring information concerning the distance from the image pickup section (20) to a visual target (1), a translational movement sensor (50) for measuring the variation due to the translational movement of a moving object, and a correction section (60) for utilizing the rotational movement driven by the ocular drive section. The correction section (60) cancels the variation due to the translational movement measured by the translational movement sensor (50) and corrects the rotation by the ocular drive section (30) by using the acquired distance information on the distance to the visual target (1) and variation information on the variation due to the translational movement so as to fix the image pickup position of the visual target (1).

9 Claims, 3 Drawing Sheets

OCULAR MOTOR CONTROLLER USING PRINCIPLE OF VESTIBULO-OCULAR REFLEX

CROSS REFERENCE TO RELATED APPLICATION

This is a 35 U.S.C. §371 application of and claims priority to International Application No. PCT/JP2008/001442, which was filed on Jun. 6, 2008, and which claims priority to Japanese Patent Application No. 2007-154612, which was filed on Jun. 12, 2007, and the disclosures of all the applications are incorporated herein by reference.

TECHNICAL FIELD

The present invention relates to an ocular motor controller provided in a moving object so as to prevent image blurring, and more particularly to an ocular motor controller that uses the principle of vestibulo-ocular reflex to prevent image blurring.

BACKGROUND ART

There exists various systems in which an image pickup device is provided as an ocular device in a moving object, such as an autonomous robot. Among them, high-accuracy ocular motor systems that simulate a bionic ocular motor nervous system exist. Such systems have a problem of blurring of an image picked up by the ocular device. When a moving object is moved, the moving object itself vibrates from side to side and up and down. Accordingly, the ocular device fixed in the moving object also vibrates from side to side and up and down. This is a main cause of the image blurring.

There are basically two methods for preventing the image blurring. One is a method that prevents the image blurring through image processing. This is a visual feedback method that moves an image frame by frame so that a visual target in the image is located at the same position as that in a blurred image to regenerate a sequential image with no blurring. The other is a method that measures the rotational or translational movement of a moving object using a gyroscope or acceleration sensor and controls the ocular device so as to cancel the movement of the moving object to thereby compensate the blurring (Patent Document 1).

Patent Document 1: Japanese PCT National Publication No. 2006-502675

DISCLOSURE OF THE INVENTION

Problems to be Solved by the Invention

The effect of the translational movement on an image is influenced by a distance to a visual target. However, there does not exist a device that directly uses information of the translational movement to prevent the image blurring with the distance to the visual target taken into consideration. Thus, an existing ocular device cannot reliably prevent the image blurring.

If the ocular motor could be controlled using the principle of vestibulo-ocular reflex in response to the translational movement based on information of the translational movement, it is possible to prevent the image blurring at higher-speed as compared to the above visual feedback method. In view of this, development of such a device has been demanded.

The present invention has been made in view of the above situation, and an object thereof is to provide an ocular motor controller that uses the principle of vestibulo-ocular reflex to prevent the image blurring.

Means for Solving the Problems

To achieve the above object, according to an aspect of the present invention, there is provided. An ocular motor controller for preventing blurring of an image picked up by an ocular device provided in a moving object, the ocular motor controller comprising: an image pickup section used as an ocular device; an ocular drive section for rotating the image pickup section such that a visual target is included in an image picked up by the image pickup section; a distance information acquisition section for acquiring information concerning the distance from the image pickup section to the visual target; a translational movement sensor for measuring a variation due to translational movement of the moving object; and a correction section for utilizing the rotational movement driven by the ocular drive section to correct the translational movement such that the variation occurring in association with the translational movement measured by the translational movement sensor is canceled so as to fix the image pickup position of the visual target by using the acquired distance information to the visual target and variation occurring in association with the translational movement.

The ocular drive section may rotate the image pickup section with one or more-degree-of-freedom including at least roll rotation, the translational movement sensor may measure the variation of the image pickup section in the pitch rotation axis direction (y-axis direction), and the correction section may correct the roll rotational movement driven by the ocular drive section by using the measured variation in the y-axis direction.

The ocular drive section may rotate the image pickup section with one or more-degree-of-freedom including at least pitch rotation, the translational movement sensor may measure the variation of the image pickup section in the roll rotation axis direction (z-axis direction), and the correction section may correct the pitch rotational movement driven by the ocular drive section by using the measured variation in the z-axis direction.

The translational movement sensor may measure the variation in the direction (x-axis direction) perpendicular to the y-axis direction and z-axis direction, and the correction section may correct the roll rotational movement and the pitch rotational movement driven by the ocular drive section by using the variation in the x-axis direction.

The image pickup section may include a pair of image pickup devices, the ocular drive section may rotate the pair of image pickup devices such that the visual target is included in a predetermined position in images picked up by the pair of image pickup devices, and the distance information acquisition section may be a rotation angle measurement section for measuring the rotation angles of the pair of image pickup devices and use the distance between the pair of image pickup devices and the rotation angles thereof.

The translational movement sensor may include a pair of three-axis acceleration sensor.

The translational movement sensor may use a differential signal between signals from a pair of the three-axis acceleration sensors to measure the variation occurring in association with the rotational movement of the moving object, and the correction section may control the ocular drive section by using the variation occurring in association with the rotational movement such that the variation occurring in association with the rotational movement measured by the translational movement sensor is canceled so as to fix the image pickup position of the visual target.

The ocular motor controller may further include a gyroscope for measuring the variation occurring in association with the rotational movement of the moving object, and the correction section may control the ocular drive section by using the variation occurring in association with the rotational movement such that the variation occurring in association with the rotational movement measured by the gyroscope is canceled so as to fix the image pickup position of the visual target.

The ocular motor controller may further include a visual feedback section for controlling the ocular drive section by using the image picked up by the image pickup section such that the image pickup section follows the movement of a moving of the visual target.

ADVANTAGES OF THE INVENTION

According to the ocular motor controller of the present invention using the principle of vestibulo-ocular reflex, the image blurring can be prevented at high speed. Further, by simplifying the correction mechanism of the ocular motor as needed from the physiological and anatomical point of view, it is possible to constitute the correction section by a simple analog circuit at lower cost.

BEST MODE FOR CARRYING OUT THE INVENTION

A preferred embodiment for practicing the present invention will be described below with reference to the accompanying drawings. FIG. 1 is a schematic block diagram for explaining a configuration of an ocular motor controller according to the present invention. As illustrated in FIG. 1, an ocular motor controller according to the present invention mainly includes an ocular device 20 provided in a moving object 10, an ocular drive section 30, a distance measurement section 40, a translational movement sensor 50, and a correction section 60. Although all the above components are provided in the moving object 10 in FIG. 1, the present invention is not limited thereto. For example, the correction section 60 need not be provided in the moving object 10 but may be externally connected to the moving object 10.

Examples of the moving object 10 include various movable objects such as a vehicle and a humanoid. The ocular device 20 is mainly constituted by an image pickup device and is configured to be able to pick up a visual target 1 and output the image thereof. More specifically the ocular device 20 is a digital video camera, etc. having an image pickup element such as a CCD or CMOS sensor and converting light received by the sensor into an electric signal to obtain an image. The ocular device 20 provided in the ocular motor controller according to the present invention may be monocular or binocular. Further, three (trinocular) or more image pickup devices may be provided.

The ocular drive section 30 drives the ocular device 20 such that the visual target 1 is included in the image picked up by the ocular device 20. More specifically, the ocular drive section 30 is constituted by an actuator obtained by combining a plurality of motors and is configured to be able to rotate the ocular device 20 with three-degree-of-freedom such as roll, pitch, and yaw-rotation. It is most computationally convenient that the ocular device 20 is rotated about the center of the image pickup surface thereof. The ocular drive section 30 having the configuration described above controls based on visual feedback such that the visual target 1 is located at the center of an image picked up by the ocular device 20.

In the case where the visual target 1 does not move, once the ocular device 20 is driven such that the visual target 1 is located at the center of an image to be picked up, this state is kept unless the moving object 10 moves, so that a stable image can be obtained. However, the ocular device 20 is assumed to be provided in the moving object 10 that inevitably moves, so that the image blurring due to the movement can be a problem. That is, a main object of the present invention is to correct the control operation of the ocular drive section 30 in consideration of the movement, especially the movement occurring in association with translational movement.

To achieve the above object, the ocular motor controller according to the present invention includes the distance measurement section 40, the translational movement sensor 50, and the correction section 60. The distance measurement section 40 measures a distance from the image pickup surface of the ocular device 20 to the visual target 1. As the distance measurement section 40, a laser sensor, an ultrasonic sensor, or the like can be used. Further, as described later, in the case where the ocular device 20 is binocular, the distance measurement section 40 may be configured to measure the distance according to the principle of triangulation based on the rotation angles of the respective ocular devices. Further, the distance measurement section 40 includes a section obtaining information of the rotation angle of the ocular device with no need to measure the distance itself if obtains information concerning the distance to the visual target.

The translational movement sensor 50 measures a variation occurring in association with the translational movement of the moving object 10. The measurement of the variation occurring in association with the translational movement allows use of the principle of vestibulo-ocular reflex in response to the translational movement. For example, as the translational movement sensor 50, an acceleration sensor may be used. The acceleration sensor includes various types, such as a MEMS sensor, an electrodynamic sensor, a strain gauge sensor, and a piezoelectric sensor, and any of the types may be used. In the present specification, the term "variation occurring in association with the translational movement of the moving object" includes acceleration, velocity, and movement distance. That is, when the acceleration can be measured, the velocity can be calculated by a one-time integration with respect to time, and the distance can be calculated by one more time integration. Therefore, the translational movement sensor 50 may not only be the acceleration sensor but also a velocity sensor or movement distance sensor. Although it is preferable to use a three-axis acceleration sensor as the translational movement sensor 50, a configuration may be employed in which the acceleration of only one axis is measured for simplification, as described later. Since the translational movement sensor 50 is used for correcting the operation of the ocular drive section, it is preferable that the translational movement sensor 50 can measure the translational movement of the moving object at a position near the ocular.

The correction section 60 correct the translational movement by using the rotational movement driven by the ocular drive section 30 such that the variation occurring in association with the translational movement measured by the translational movement sensor 50 is canceled so as to fix the image position of the visual target 1 by using the distance to the visual target 1 and the variation occurring in association with the translational movement.

Next, with reference to FIG. 2, the correction section for correcting the rotational movement using the distance to the visual target and the variation occurring in association with the translational movement will be described in more detail. FIG. 2 is a view for explaining a coordinate defining parameters of the ocular motor controller according to the present invention. Note that FIG. 2 illustrates an example in which a binocular ocular device is used to measure the distance to the visual target based on the rotation angles of the respective ocular devices. However, the present invention is not limited thereto, but a monocular type ocular device provided with a distance meter may be used as described above.

In the present specification, it is assumed that the pitch is a rotation about the y-axis at a reference position of the ocular device 20, the roll is a rotation about the z-axis, and the yaw is a rotation about the x-axis which is perpendicular to both the y- and z-axes.

The ocular drive section 30 causes the ocular devices $20_l$ and $20_r$ to rotate such that the visual target 1 is located at the same position in the images picked up by the ocular devices $20_l$ and $20_r$. The distance to the visual target can be measured based on the rotation angles of the respective ocular devices obtained at this time. That is, according to the sine theorem, the following relational expression is established between the rotation angles and distance between the ocular devices from the relationship illustrated in FIG. 2.

$$\frac{l_r \cos\theta_{oe-r}}{\sin\left(\varphi_{oe-l} + \frac{\pi}{2}\right)} = \frac{l_l \cos\theta_{oe-l}}{\sin\left(\frac{\pi}{2} - \varphi_{oe-r}\right)} = \frac{L}{\sin(\varphi_{oe-r} - \varphi_{oe-l})} \quad \text{[Formula 1]}$$

Based on the above relational expression, the distances to the visual target 1 from the image pickup surfaces of the ocular devices $20_l$ and $20_r$ are represented by the following formulae.

$$\begin{cases} l_l = \dfrac{L\cos\varphi_{oe-l}}{\cos\theta_{oe-r}\sin(\varphi_{oe-r} - \varphi_{oe-l})} \\ l_r = \dfrac{L\cos\varphi_{oe-r}}{\cos\theta_{oe-l}\sin(\varphi_{oe-r} - \varphi_{oe-l})} \end{cases} \quad \text{[Formula 2]}$$

Assuming that the visual target 1 is not moved but fixed, the relationship between variations of the ocular device in the θ direction (pitch-rotation) and φ direction (roll-rotation) for canceling the variation occurring in respective cases where the moving object 10 moves in the x-axis direction at a velocity of dx/dt, where the moving object 10 moves in the y-axis direction at a velocity of dy/dt, and where the moving object 10 moves in the z-axis direction at a velocity of dz/dt is as follows. Note that the roll is a rotation about the z-axis, and pitch is a rotation about the y-axis.

Case where the moving object 10 moves in the x-axis direction at a velocity of dx/dt $$\varphi\text{direction}\begin{cases} l_l\cos\theta_{oe-l}\dfrac{d\varphi_{oe-l}}{dt} = \dfrac{dx}{dt}\sin\varphi_{oe-l} \\ l_r\cos\theta_{oe-r}\dfrac{d\varphi_{oe-r}}{dt} = \dfrac{dx}{dt}\sin\varphi_{oe-r} \end{cases} \quad \text{[Formula 3]}$$

$$\theta\text{direction}\begin{cases} l_l\dfrac{d\theta_{oe-l}}{dt} = \dfrac{dx}{dt}\cos\varphi_{oe-l}\sin\theta_{oe-l} \\ l_r\dfrac{d\theta_{oe-r}}{dt} = \dfrac{dx}{dt}\cos\varphi_{oe-r}\sin\theta_{oe-r} \end{cases}$$

Case where the moving object 10 moves in the y-axis direction at a velocity of dy/dt $$\varphi\text{direction}\begin{cases} l_l\cos\theta_{oe-l}\dfrac{d\varphi_{oe-l}}{dt} = -\dfrac{dy}{dt}\cos\varphi_{oe-l} \\ l_r\cos\theta_{oe-r}\dfrac{d\varphi_{oe-r}}{dt} = -\dfrac{dy}{dt}\cos\varphi_{oe-r} \end{cases} \quad \text{[Formula 4]}$$

$$\theta\text{direction}\begin{cases} l_l\dfrac{d\theta_{oe-l}}{dt} = \dfrac{dy}{dt}\sin\varphi_{oe-l}\sin\theta_{oe-l} \\ l_r\dfrac{d\theta_{oe-r}}{dt} = \dfrac{dy}{dt}\sin\varphi_{oe-r}\sin\theta_{oe-r} \end{cases}$$

Case where the moving object 10 moves in the z-axis direction at a velocity of dz/dt $$\varphi\text{direction}\begin{cases} \dfrac{d\varphi_{oe-l}}{dt} = 0 \\ \dfrac{d\varphi_{oe-r}}{dt} = 0 \end{cases} \quad \text{[Formula 5]}$$

$$\theta\text{direction}\begin{cases} l_l\dfrac{d\theta_{oe-l}}{dt} = \dfrac{dz}{dt}\cos\theta_{oe-l} \\ l_r\dfrac{d\theta_{oe-r}}{dt} = \dfrac{dz}{dt}\cos\theta_{oe-r} \end{cases}$$

Thus, based on the relational expressions of Formulae 3 to 5, variations for correcting the rotational movement driven by the ocular drive section in association with the translational movement of the moving object in the θ direction (pitch-rotation) and φ direction (roll-rotation) are represented by the following formulae.

$$\varphi\text{direction}\begin{cases} \dfrac{d\varphi_{oe-l}}{dt} = \dfrac{dx}{dt}\dfrac{\sin\varphi_{oe-l}}{l_l\cos\theta_{oe-l}} - \dfrac{dy}{dt}\dfrac{\cos\varphi_{oe-l}}{l_l\cos\theta_{oe-l}} \\ \dfrac{d\varphi_{oe-r}}{dt} = \dfrac{dx}{dt}\dfrac{\sin\varphi_{oe-r}}{l_r\cos\theta_{oe-r}} - \dfrac{dy}{dt}\dfrac{\cos\varphi_{oe-r}}{l_r\cos\theta_{oe-r}} \end{cases} \quad \text{[Formula 6]}$$

$$\theta\text{direction}\begin{cases} \dfrac{d\theta_{oe-l}}{dt} = \dfrac{dx}{dt}\dfrac{\cos\varphi_{oe-l}\sin\theta_{oe-l}}{l_l} + \dfrac{dy}{dt}\dfrac{\sin\varphi_{oe-l}\sin\theta_{oe-l}}{l_l} + \dfrac{dz}{dt}\dfrac{\cos\theta_{oe-l}}{l_l} \\ \dfrac{d\theta_{oe-r}}{dt} = \dfrac{dx}{dt}\dfrac{\cos\varphi_{oe-r}\sin\theta_{oe-r}}{l_r} + \dfrac{dy}{dt}\dfrac{\sin\varphi_{oe-r}\sin\theta_{oe-r}}{l_r} + \dfrac{dz}{dt}\dfrac{\cos\theta_{oe-r}}{l_r} \end{cases}$$

By using the above relational expressions, it is possible to correct the rotational movement so as to cancel the variation occurring in association with the translational movement. That is, it is sufficient for the correction section to give the φ direction correction expressions of Formula 6 to the horizontal direction ocular motor control system of the ocular drive section and give the θ direction correction expressions of Formula 6 to the vertical direction ocular motor control system thereof.

A more specific description will be made using a case where the ocular motor controller according to the present invention has been applied to a visual line movement control system disclosed in Japanese PCT National Publication No. 2006-502675 filed by one of the present inventors with reference to FIGS. 3 and 4. FIG. 3 is a block diagram illustrating horizontal direction (roll-rotation) movement control of the visual line movement control system to which the ocular motor controller according to the present invention has been applied, and FIG. 4 is a block diagram illustrating vertical direction (pitch-rotation) movement control of the visual line movement control system.

As illustrated in FIG. 3, for control of the roll-rotation ($\phi$ direction), the current roll angles of the ocular devices from left and right roll encoders and the current pitch angles of the ocular devices from left and right pitch encoders are input to the left and right $\phi$ direction correction expressions, respectively. The encoders are configured to measure the rotation angle of the ocular device. Further, the translational accelerations in both the x-axis direction and the y-axis direction are input to the left and right $\phi$ direction correction expressions respectively. By inputting the outputs of the correction expressions as control parameters $k_x$ and $k_{xr}$ of binocular ocular drive section, i.e., ocular drive sections $V_l$ and $V_r$, a variation occurring in association with the translational movement can be canceled, thereby preventing the image blurring.

Further, as illustrated in FIG. 4, for control of the pitch-rotation ($\theta$ direction), the current pitch angles of the ocular devices from left and right pitch encoders and the current roll angles of the ocular devices from left and right roll encoders are input to the left and right $\theta$ direction correction expressions, respectively. Further, the translational accelerations in the x-axis direction, the y-axis direction, and the z-axis direction are input to the left and right $\theta$ direction correction expressions respectively. By inputting the outputs of the correction expressions to the binocular ocular drive section, a variation occurring in association with the translational movement can be canceled, thereby preventing the image blurring.

As described above, in the case where the binocular type ocular device is employed in the ocular motor controller according to the present invention, the distance to the visual target can be measured based on the rotation angle of the ocular device. Thus, it is possible to correct the rotational movement by using the obtained distance and the variation occurring in association with the translational movement (translational acceleration).

A more detailed description of the visual line movement control system itself has been given in Japanese PCT National Publication No. 2006-502675 and is omitted here. The configuration of the visual line movement control system is not limited to that illustrated in the drawing, but the present invention may be applied to any type of the visual line movement control system as long as the visual line movement control system can control the rotation movement of the ocular device by using the distance to the visual target and the information concerning the variation occurring in association with the translational movement.

Next, a simplified configuration of the above correction section will be described. The above correction expressions of Formula 6 take the variations occurring in association with the translational movement in all the x-, y-, and z-axis directions into consideration for correction. On the other hand, the correction expressions can be simplified under the following condition.

It can be considered that, in a state where the ocular device keeps its visual line on the visual target, the moving object takes a sight on the visual target in a position substantially opposed to the visual target. More specifically, when an attempt is made to pick up the visual target by the ocular device disposed at a portion corresponding to, e.g., the head of the moving object, the ocular device is first directed to the visual target, and then the head is rotated to face the visual target. Then, the ocular device enters a state where it keeps its visual line on the visual target. In this state, the head faces the visual target and the moving object takes a sight on the visual target in a position substantially opposite to the visual target. In general, the blurring of an image to be picked up by the ocular device becomes problem not at the stage during which the ocular device searches for the visual target but at the stage in which the ocular device enters a stable state where it keeps its visual line on the visual target with the head of the moving object directed to the visual target. Thus, in a state where the ocular device closely watches the visual target with the moving object in a position substantially opposed to the visual target, the following conditions are satisfied.

$$\begin{cases} |\sin\varphi_{oe-l}| \langle\langle |\cos\varphi_{oe-l}| \\ |\sin\varphi_{oe-r}| \langle\langle |\cos\varphi_{oe-r}| \end{cases} \quad \text{[Formula 7]}$$

$$\begin{cases} |\sin\varphi_{oe-l}\sin\theta_{oe-l}| \langle\langle |\cos\varphi_{oe-l}\sin\theta_{oe-l}| \langle\langle |\cos\theta_{oe-l} \\ |\sin\varphi_{oe-r}\sin\theta_{oe-r}| \langle\langle |\cos\varphi_{oe-r}\sin\theta_{oe-r}| \langle\langle |\cos\theta_{oe-r} \end{cases}$$

Further, assuming that the visual target is located sufficiently apart from the moving object, i.e., assuming that $l_l$, $l_r \gg L$ is satisfied, the rotation angles of the left and right ocular devices can be approximated as follows.

$$\varphi_{oe-l} \approx \varphi_{oe-r}, \theta_{oe-l} \approx \theta_{oe-r} \quad \text{[Formula 8]}$$

Therefore, when the correction expressions of Formula 6 are approximated using Formulae 7 and 8, the following relational expressions are obtained.

[Formula 9]

$$\varphi\text{direction} \begin{cases} \dfrac{d\varphi_{oe-l}}{dt} \approx -\dfrac{dy}{dt}\dfrac{\cos\varphi_{oe-l}}{l_l\cos\theta_{oe-l}} = -\dfrac{dy}{dt}\dfrac{\cos\theta_{oe-r}}{L\cos\theta_{oe-l}}\dfrac{\sin(\varphi_{oe-r}-\varphi_{oe-l})}{} \approx -\dfrac{dy}{dt}\dfrac{\varphi_{oe-r}-\varphi_{oe-l}}{L} \\ \dfrac{d\varphi_{oe-r}}{dt} \approx -\dfrac{dy}{dt}\dfrac{\cos\varphi_{oe-r}}{l_r\cos\theta_{oe-r}} = -\dfrac{dy}{dt}\dfrac{\cos\theta_{oe-l}}{L\cos\theta_{oe-r}}\dfrac{\sin(\varphi_{oe-r}-\varphi_{oe-l})}{} \approx -\dfrac{dy}{dt}\dfrac{\varphi_{oe-r}-\varphi_{oe-l}}{L} \end{cases}$$

$$\theta\text{direction} \begin{cases} \dfrac{d\theta_{oe-l}}{dt} \approx \dfrac{dz}{dt}\dfrac{\cos\theta_{oe-l}}{l_l} = \dfrac{dz}{dt}\dfrac{\cos\theta_{oe-l}\cos\theta_{oe-r}}{L\cos\varphi_{oe-l}}\dfrac{\sin(\varphi_{oe-l}-\varphi_{oe-r})}{} \approx \dfrac{dz}{dt}\dfrac{\varphi_{oe-r}-\varphi_{oe-l}}{L} \\ \dfrac{d\theta_{oe-r}}{dt} \approx \dfrac{dz}{dt}\dfrac{\cos\theta_{oe-r}}{l_r} = \dfrac{dz}{dt}\dfrac{\cos\theta_{oe-l}\cos\theta_{oe-r}}{L\cos\varphi_{oe-r}}\dfrac{\sin(\varphi_{oe-l}-\varphi_{oe-r})}{} \approx \dfrac{dz}{dt}\dfrac{\varphi_{oe-r}-\varphi_{oe-l}}{L} \end{cases}$$

Summarizing the above, under the condition where the ocular device takes a sight on the visual target located sufficiently apart from the moving object with the moving object in a position opposed to the visual target, variations of the rotational movement driven by the ocular drive section imparts in association with the translational movement of the moving object in the θ direction (pitch-rotation) and φ direction (roll-rotation) are represented by the following relational expressions.

$$\varphi \text{direction} \begin{cases} \dfrac{d\varphi_{oe-l}}{dt} \approx -\dfrac{dy}{dt}\dfrac{\varphi_{oe-r}-\varphi_{oe-l}}{L} \\ \dfrac{d\varphi_{oe-r}}{dt} \approx -\dfrac{dy}{dt}\dfrac{\varphi_{oe-r}-\varphi_{oe-l}}{L} \end{cases} \quad \text{[Formula 10]}$$

$$\theta \text{direction} \begin{cases} \dfrac{d\theta_{oe-l}}{dt} \approx \dfrac{dz}{dt}\dfrac{\varphi_{oe-r}-\varphi_{oe-l}}{L} \\ \dfrac{d\theta_{oe-r}}{dt} \approx \dfrac{dz}{dt}\dfrac{\varphi_{oe-r}-\varphi_{oe-l}}{L} \end{cases}$$

Even with the above simplified relational expressions, it is possible to correct the rotational movement so as to cancel the variation occurring in association with the translational movement as in the case where the correction expressions of Formula 6 are used. That is, it is sufficient for the correction section to give the φ direction correction expressions of Formula 10 to the horizontal direction ocular motor control system of the ocular drive section and give the θ direction correction expressions of Formula 10 to the vertical direction ocular motor control system thereof.

Further, as can be understood from Formula 10, it is only necessary to measure the roll angle ($\varphi_{oe}$) of the ocular device, and it is only necessary to use the roll angle and data obtained by the translational movement sensor measuring only the variation (dy/dt) in the y-axis direction for correction of the variation in the φ direction, so that a single-axis acceleration sensor will be sufficient. Further, for correction of the variation in the θ direction, it is only necessary to use the data obtained by the translational movement sensor measuring only the variation (dz/dt) in the z-axis direction, so that a single-axis acceleration sensor will be sufficient.

Thus, in the case of, for example, a moving object that can move only in the horizontal direction (on x-y plane), it is only necessary to correct the roll direction rotational movement driven by the ocular drive section, so that it is sufficient for the translational movement sensor to measure the variation in the y-axis direction. Further, in the case of a moving object that can move only in the vertical direction (on x-z plane), it is only necessary to correct the pitch direction rotational movement driven by the ocular drive section, so that it is sufficient for the translational movement sensor to measure the variation in the z-axis direction. In the case where the rotational movement in both the roll and pitch directions needs to be corrected, it is sufficient for the translational movement sensor to measure the variations in the y-axis direction and the z-axis direction.

As in the case of FIGS. 3 and 4, a case where the above simplified ocular motor controller according to the present invention has been applied to the visual line movement control system disclosed in Japanese PCT National Publication No. 2006-502675 will be described with reference to FIGS. 5 and 6. FIG. 5 is a block diagram illustrating horizontal direction (roll-rotation) movement control of the visual line movement control system to which the simplified ocular motor controller according to the present invention has been applied, and FIG. 6 is a block diagram illustrating vertical direction (pitch-rotation) movement control of the visual line movement control system.

As illustrated in FIG. 5, for control of the roll-rotation (φ direction), by inputting, to the ocular drive section, a value obtained by calculating a difference between the current roll angles of the ocular devices acquired from left and right roll encoders and multiplying the result and the y-direction translational acceleration, it is possible to cancel the variation occurring in association with the translational movement, thereby preventing the image blurring.

Further, as illustrated in FIG. 6, for control of the pitch-rotation (θ direction), by inputting, to the ocular drive section, a value obtained by calculating a difference between the current roll angles of the ocular devices acquired from left and right roll encoders and multiplying the result and the z-direction translational acceleration, it is possible to cancel the variation occurring in association with the translational movement, thereby preventing the image blurring.

As described above, in the simplified ocular motor controller, it is sufficient for the correction section to include only an adder and a multiplier. Thus, the correction section can be constituted by a simple analog circuit. This not only increases the response rate but also reduces manufacturing cost.

As described above, the ocular motor controller according to the present invention may be configured to measure the variations occurring in association with the translational movement in all the x-, y-, and z-axis directions for correction of the roll and pitch rotational movement or, more simply, the ocular motor controller may be configured to measure the variations occurring in association with the translational movement in y- and z-axis directions for correction of the roll and pitch rotational movement. Further, in the case where the moving object moves only in the horizontal or vertical direction, the ocular motor controller may be configured to measure the variation occurring in association with the transitional movement only in the y-axis direction or z-axis direction so as to correct only the roll or pitch rotational movement.

In the case where a pair of three-axis acceleration sensors is used as the translational movement sensor 50 and disposed apart from each other in the moving object 10, it is possible to measure the rotational movement of the moving object. That is, the rotation angle of the moving object can be acquired by using a differential signal between signals from the pair of three-axis acceleration sensors. Thus, the correction section 60 can correct the rotational movement driven by the ocular drive section using the rotation angle of the moving object such that not only the translational movement but also the rotational movement thereof is canceled so as to fix the image pickup position of the visual target. In the case of the pair of three-axis acceleration sensors, a sum signal of the signals from the pair of three-axis acceleration sensors becomes the translational acceleration.

In order to measure the rotational movement of the moving object 10, a gyroscope may be provided in the moving object 10 so as to measure the rotation angle of the moving object to be changed in association with the rotational movement of the moving object. In this case, the correction section 60 can correct the rotational movement driven by the ocular drive section using the rotation angle of the moving object such that the variation occurring in association with the rotational movement measured by the gyroscope is canceled so as to fix the image pickup position of the visual target.

Although the visual target is fixed in the above examples, the ocular motor controller according to the present invention may be applied to a case where the visual target moves. In the case where the visual target moves, visual feedback is performed using an image to be picked up. That is, in the case where the visual target 1 moves, an image to be picked up by the ocular device 20 is used to control the ocular drive section 30 such that the ocular device 20 follows the movement of the moving visual target. Thus, even in the case where the visual target moves, it is possible to allow the moving visual target to be always located at the same position in the image by the visual feedback at the time of image pickup. Even if, at the same time, the moving object translationally moves, correction can be made by the ocular motor controller so as not to cause the image blurring.

The ocular motor controller according to the present invention is not limited to the above examples illustrated in the drawings, but may be variously modified within the spirit of the present invention.

EXPLANATION OF REFERENCE SYMBOLS

Figure 1:
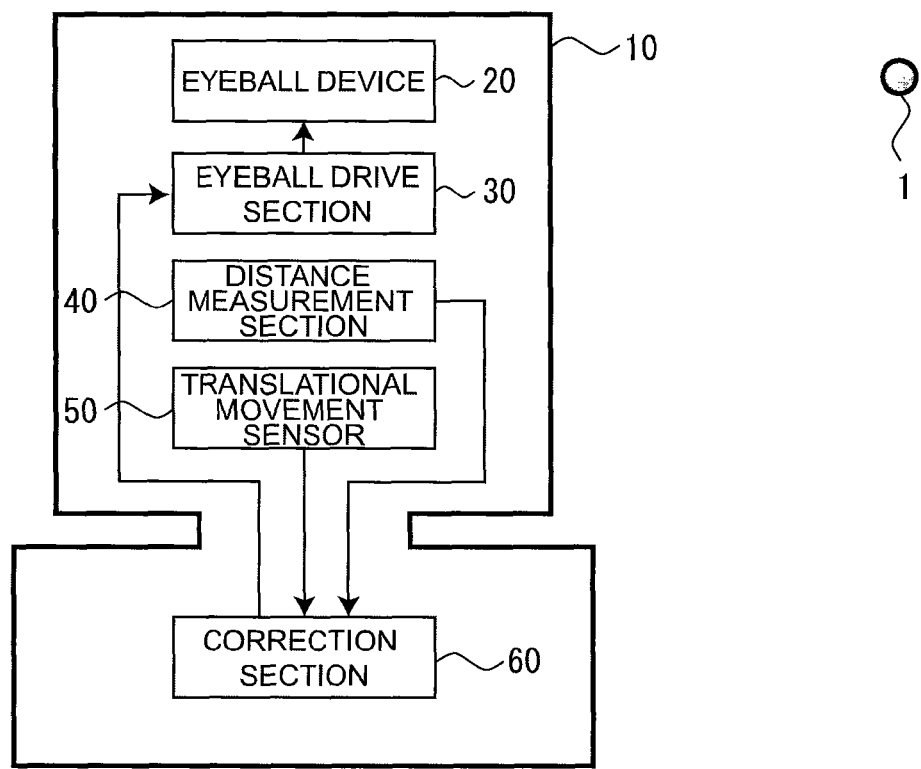
FIG. 1 is a schematic block diagram for explaining a configuration of an ocular motor controller according to the present invention.
Figure 2:
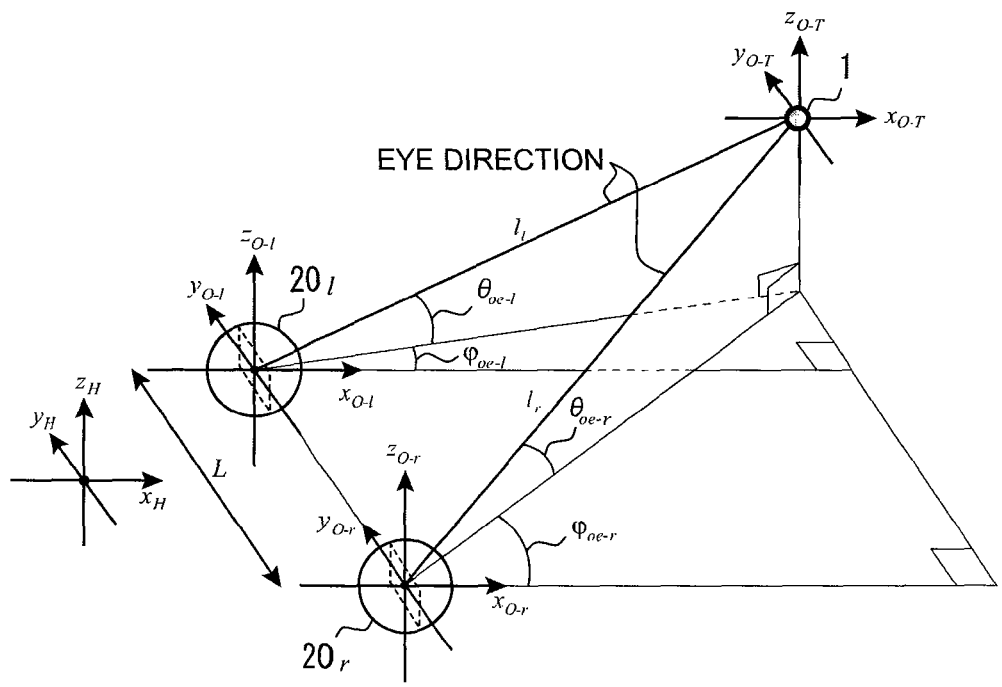
FIG. 2 is a view for explaining a coordinate defining parameters of the ocular motor controller according to the present invention.
Figure 3:
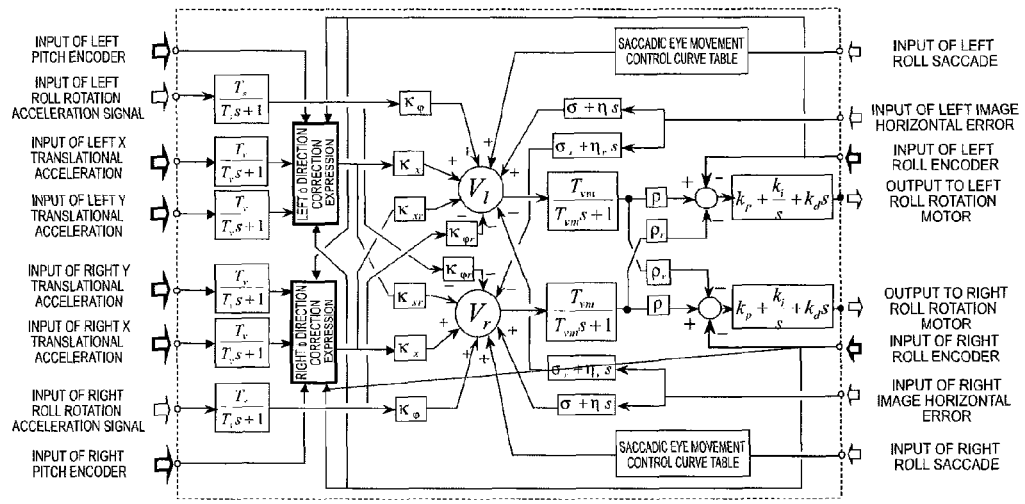
FIG. 3 is a block diagram illustrating horizontal direction movement control of a visual line movement control system to which the ocular motor controller according to the present invention has been applied.
Figure 4:
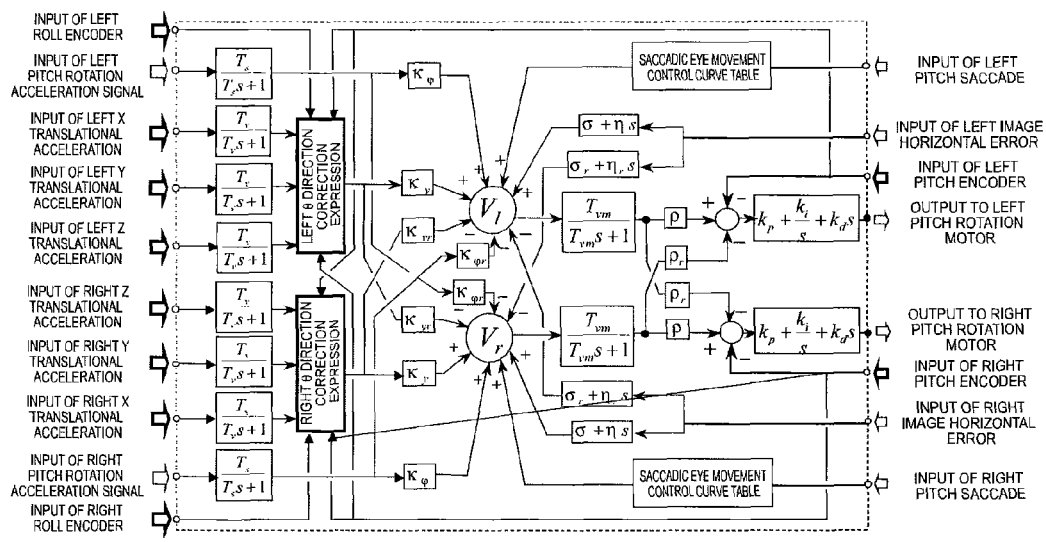
FIG. 4 is a block diagram illustrating vertical direction movement control of a visual line movement control system to which the ocular motor controller according to the present invention has been applied.
Figure 5:
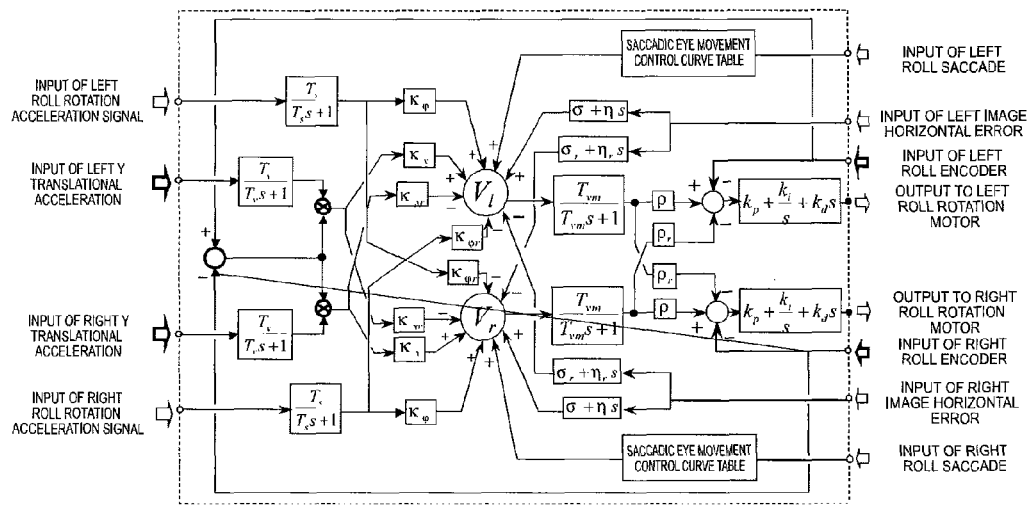
FIG. 5 is a block diagram illustrating horizontal direction movement control of a visual line movement control system to which a simplified ocular motor controller according to the present invention has been applied.
Figure 6:
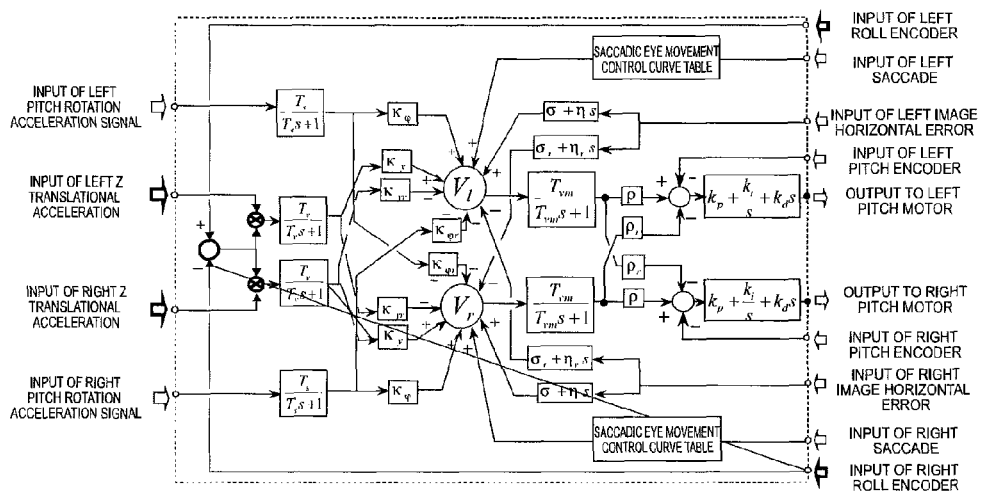
FIG. 6 is a block diagram illustrating vertical direction movement control of a visual line movement control system to which a simplified ocular motor controller according to the present invention has been applied.

1: Visual target
10: Moving object
20: Ocular device
30: Ocular drive section
40: Distance measurement section
50: Translational movement sensor
60: Correction section

What is claimed is:

1. An ocular motor controller for preventing blurring of an image picked up by an ocular device provided in a moving object, the ocular motor controller comprising:
   an image pickup section used as an ocular device;
   an ocular drive section for rotating the image pickup section with tracking of a visual target such that the visual target is included in an image picked up by the image pickup section;
   a distance information acquisition section for acquiring information concerning the distance from the image pickup section to the visual target;
   a translational movement sensor for measuring a variation due to translational movement of the moving object that is independent from the rotational movement of the image pick up section driven by the ocular drive section; and
   a correction section for utilizing the rotational movement of the image pick up section driven by the ocular drive section to correct the translational movement such that the variation occurring in association with the translational movement measured by the translational movement sensor is canceled so as to fix the image pickup position of the visual target by using the acquired distance information to the visual target and variation occurring in association with the translational movement.

2. The ocular motor controller according to claim 1, in which:
   the ocular drive section rotates the image pickup section with one or more-degree-of-freedom including at least roll rotation,
   the translational movement sensor measures the variation of the image pickup section in the pitch rotation axis direction (y-axis direction), and
   the correction section corrects the roll rotational movement driven by the ocular drive section by using the measured variation in the y-axis direction.

3. The ocular motor controller according to claim 1, in which:
   the ocular drive section rotates the image pickup section with one or more-degree-of-freedom including at least pitch rotation,
   the translational movement sensor measures the variation of the image pickup section in the roll rotation axis direction (z-axis direction), and
   the correction section corrects the pitch rotational movement driven by the ocular drive section by using the measured variation in the z-axis direction.

4. The ocular motor controller according to claim 3, in which:
   the translational movement sensor measures the variation in the direction (x-axis direction) perpendicular to the y-axis direction and z-axis direction, and
   the correction section corrects the roll rotational movement and the pitch rotational movement driven by the ocular drive section by using the measured variation in the x-axis direction.

5. The ocular motor controller according to claims 1, in which:
   the image pickup section includes a pair of image pickup devices,
   the ocular drive section rotates the pair of image pickup devices such that the visual target is located at a predetermined position in images picked up by the pair of image pickup devices, and
   the distance information acquisition section comprises a rotation angle measurement section for measuring the rotation angles of the pair of image pickup devices and uses the distance between the pair of image pickup devices and the rotation angles thereof.

6. The ocular motor controller according to claim 1, in which:
   the translational movement sensor includes a pair of three-axis acceleration sensor.

7. The ocular motor controller according to claim 6, in which:
   the translational movement sensor uses a differential signal between signals from a pair of the three-axis acceleration sensors to measure the variation occurring in association with the rotational movement of the moving object, and the correction section controls the ocular drive section by using the variation occurring in association with the rotational movement such that the variation occurring in association with the rotational movement measured by the translational movement sensor is canceled so as to fix the image pickup position of the visual target.

8. The ocular motor controller according to claims 1, further comprising a gyroscope that measures the variation occurring in association with the rotational movement of the moving object, and the correction section controlling the ocular drive section by using the variation occurring in association with the rotational movement such that the variation occurring in association with the rotational movement measured by the gyroscope is canceled so as to fix the image pickup position of the visual target.

9. The ocular motor controller according to claim 1, further comprising a visual feedback section for controlling the ocular drive section by using the image picked up by the image pickup section such that the image pickup section follows the movement of a moving of the visual target.

\* \* \* \* \*

UNITED STATES PATENT AND TRADEMARK OFFICE
CERTIFICATE OF CORRECTION

PATENT NO. : 8,253,814 B2  
APPLICATION NO. : 12/663897  
DATED : August 28, 2012  
INVENTOR(S) : Xiaolin Zhang et al.

Page 1 of 1

It is certified that error appears in the above-identified patent and that said Letters Patent is hereby corrected as shown below:

Column 2, line 9 – Replace "provided. An" with --provided an--

Column 2, line 60 – Replace "acceleration sensor" with --acceleration sensors--

Column 4, line 30 – Replace "if obtains" with --if it obtains--

Column 4, line 60 – Replace "correct the" with --corrects the--

Column 7, line 21 – Replace "right ϕdirection" with --right ϕ direction--

Column 7, line 28 – Replace "rotation (θdirection)" with --rotation (θ direction)--

Column 8, line 27 – Replace "becomes problem" with --becomes a problem--

Column 10, line 13 – Replace "rotation (θdirection)" with --rotation (θ direction)--

Column 12, line 2 – Replace "pick up section" with --pickup section)--

Column 12, line 5 – Replace "pick up section" with --pickup section)--

Column 14, line 11 – Replace "moving of the visual" with --moving visual)--

Signed and Sealed this  
Twelfth Day of February, 2013

Teresa Stanek Rea  
*Acting Director of the United States Patent and Trademark Office*